US012265367B2

(12) United States Patent
Wang et al.

(10) Patent No.: US 12,265,367 B2
(45) Date of Patent: Apr. 1, 2025

(54) ARTIFICIAL INTELLIGENCE (AI) COMPANIONS FOR FUNCTION BLOCKS IN A PROGRAMMABLE LOGIC CONTROLLER (PLC) PROGRAM FOR INTEGRATING AI IN AUTOMATION

(71) Applicant: Siemens Aktiengesellschaft, Munich (DE)

(72) Inventors: Lingyun Wang, Princeton, NJ (US); Arquimedes Martinez Canedo, Plainsboro, NJ (US)

(73) Assignee: Siemens Aktiengesellschaft, Munich (DE)

(*) Notice: Subject to any disclaimer, the term of this patent is extended or adjusted under 35 U.S.C. 154(b) by 283 days.

(21) Appl. No.: 17/754,413

(22) PCT Filed: Oct. 14, 2019

(86) PCT No.: PCT/US2019/056088
§ 371 (c)(1),
(2) Date: Mar. 31, 2022

(87) PCT Pub. No.: WO2021/076093
PCT Pub. Date: Apr. 22, 2021

(65) Prior Publication Data
US 2022/0342377 A1    Oct. 27, 2022

(51) Int. Cl.
*G05B 19/05* (2006.01)
*G06N 3/044* (2023.01)

(52) U.S. Cl.
CPC .......... *G05B 19/056* (2013.01); *G06N 3/044* (2023.01); *G05B 2219/13004* (2013.01)

(58) Field of Classification Search
CPC ........ G05B 19/056; G05B 2219/13004; G06N 4/044

(Continued)

(56) References Cited

U.S. PATENT DOCUMENTS 7,881,816 B2 * 2/2011 Mathiesen ......... G05B 19/4185
700/47
11,640,566 B2 * 5/2023 Stump ...................... G06F 8/77
717/107

(Continued)

FOREIGN PATENT DOCUMENTS

CN        1455566 A    11/2003
CN      104350435 A     2/2015

(Continued)

OTHER PUBLICATIONS

PCT International Search Report and Written Opinion of International Searching Authority mailed Jun. 22, 2020 corresponding to PCT International Application No. PCT/US2019/056088 filed Oct. 14, 2019.

(Continued)

*Primary Examiner* — Md Azad

(57) ABSTRACT

A system and a method provide an Artificial Intelligence (AI) companion for each Function Block in a Programmable Logic Controller (PLC) program to integrate AI in automation systems. Multiple function blocks and system function blocks are grouped into a logic group. A control problem is broken down from a top level into logical partitions as several functions that are programmed as Function Blocks in a PLC program. Each Function Block and the entire PLC program are integrated with an associated AI Companion. A runtime system for the AI Companion provides new runtime capabilities. An approach to implementing the AT Companions is provided. A method of controlling an automation process is also provided.

20 Claims, 8 Drawing Sheets

(58) Field of Classification Search
USPC .......................................................... 700/47
See application file for complete search history.

(56) References Cited

U.S. PATENT DOCUMENTS

| | | | | |
|---|---|---|---|---|
| 2013/0297548 | A1* | 11/2013 | Cescolini | G05B 19/056 |
| | | | | 706/46 |
| 2015/0073751 | A1* | 3/2015 | Liao | G05B 19/058 |
| | | | | 702/185 |
| 2017/0017221 | A1* | 1/2017 | Lamparter | G05B 19/056 |
| 2019/0103763 | A1* | 4/2019 | Colclazier | G05B 15/02 |
| 2019/0294137 | A1 | 9/2019 | Shinsuke et al. | |
| 2021/0096551 | A1* | 4/2021 | Sayyarrodsari | G06Q 10/06395 |

FOREIGN PATENT DOCUMENTS

| | | |
|---|---|---|
| CN | 205563224 U | 9/2016 |
| CN | 107250932 A | 10/2017 |
| CN | 109270915 A | 1/2019 |
| CN | 109459990 A | 3/2019 |
| CN | 109767836 A | 5/2019 |
| CN | 110288987 A | 9/2019 |
| EP | 1921528 A2 | 5/2008 |

OTHER PUBLICATIONS

Zhu Jinfang: "Artificial intelligence in electrical Application in engineering automation", Chemical Engineering & Equipment, p. 175-183, May 15, 2013.
Ren Junjie et al:"The realization of PID controller in closed-loop control system based on PLC ", Apr. 25, 2009.

* cited by examiner

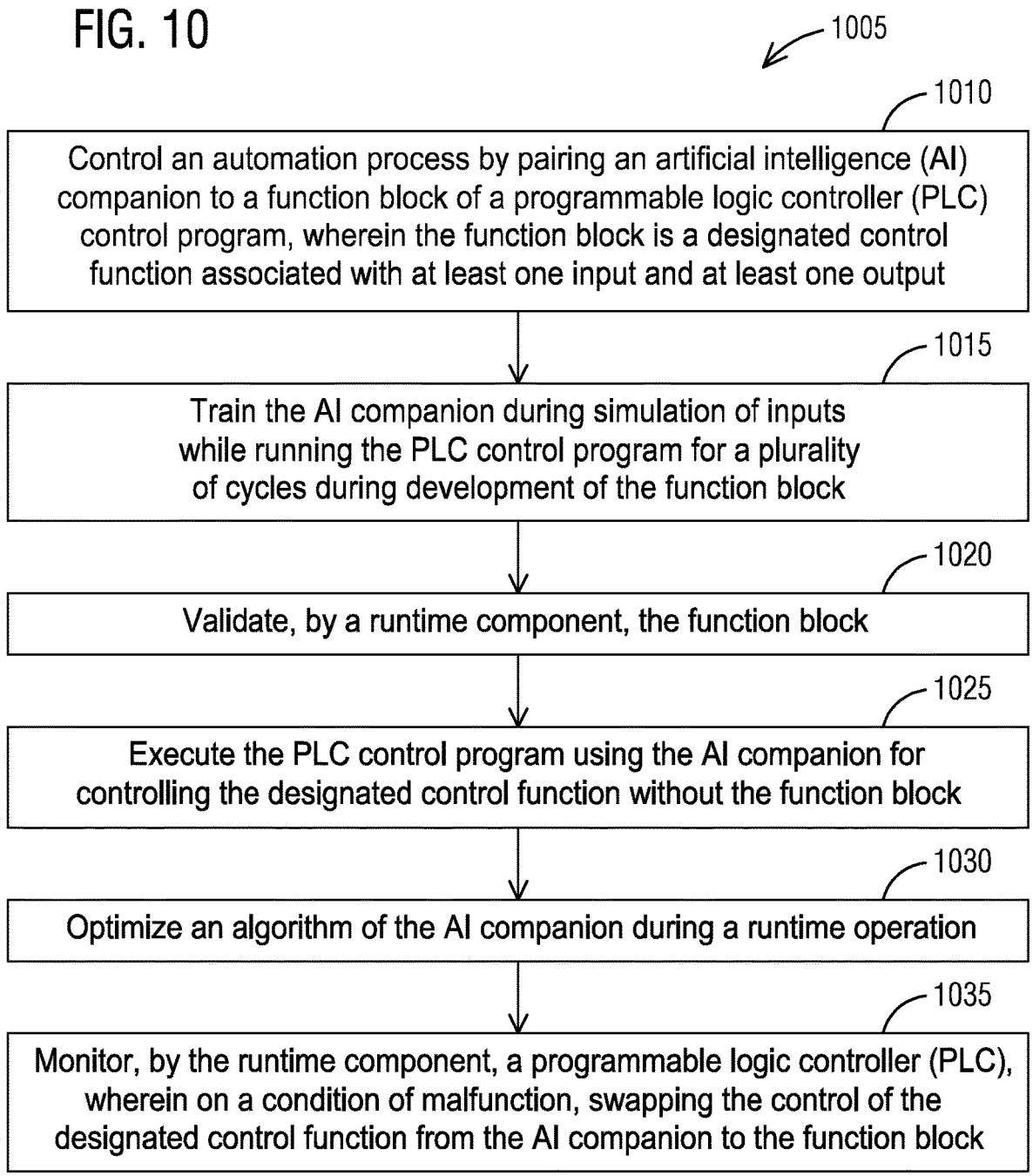

ARTIFICIAL INTELLIGENCE (AI) COMPANIONS FOR FUNCTION BLOCKS IN A PROGRAMMABLE LOGIC CONTROLLER (PLC) PROGRAM FOR INTEGRATING AI IN AUTOMATION

BACKGROUND

1. Field

Aspects of the present invention generally relate to a system and a method that enable an Artificial Intelligence (AI) companion for each Function Block in a Programmable Logic Controller (PLC) program without changing the existing programs. AI and traditional automation are brought together at the programming level.

2. Description of the Related Art

Automation systems are used to control the operation of machines and other components in a systematic manner. Typical automation systems usually include equipment from multiple vendors. Each piece of equipment may use vendor-specific programming languages, runtime environments, and protocols. The traditional automation programming paradigm is not designed to take advantage of Artificial Intelligence (AI). The algorithm in a Function Block is coded, not learned. A lot of data is provided in the Programmable Logic Controller (PLC) can be also used for AI, which can ultimately improve the PLC performance.

Today's automation programs are coded in an IEC61131-3 compliant engineering environment (e.g. SIMATIC TIA Portal) and executed in an industrial programmable logic controller (e.g. SIMATIC S7-1500 CPU). The IEC61131-3 languages such as Ladder-logic Diagram, Statement List (STL) and Structured Control Language (SCL) were created for electrical engineers. Functions are encapsulated in FB (Function blocks) or SFB (System function blocks). Each block has input port and output ports. Function blocks can be wired together to compose a larger program. The ladder-diagram programming was designed for electricians with little or no training in software programming to follow the logical flow of each rung, in the same way an electrical-control schematic can be used. PLC was created in 1960s and IEC61131 in 1980s.

The recent rise of AI (and machine learning) in 21st century would not be possible without the availability of ever increasing computation power and ubiquitous data. AI is very good at discovering patterns in the data, often faster and better than humans. Typically, a large data set, as input, is required for extensive training for an AI algorithm. Once trained, a trained model can be created and deployed onto the system. During execution, the new data set can be fed into the model, inference will occur at runtime, and the result is the desired output.

Recently the industrial players are applying the advancement of AI technology in the traditional industrial controllers. One example is that Siemens just announced an SIMATIC S7-1500 TM NPU (Neuro Processing Unit) module for S7-1500 PLC and ET200-MP I/O system. The NPU I/O module contains an Intel Movidius Myriad X Vision processing unit, enabling the efficient processing of neural networks. As an integrated module to the traditional PLC, backbone communication bus is available to exchange data (e.g. the result of neural network processing) between the NPU and PLC.

However, this current advancement is only touching the surface of the power of AI in automation. The hardware (GPU, HW accelerator, etc.) add-on to PLC provides necessary processing power for training and executing the complex AI models. Additional AI-enabled features (e.g. adding camera and vision processing) enabled with NPU is also a decoupled add-on to automation functions executed in the PLC programs. The AI is still not directly assisting the traditional automation functions executed in the PLC programs.

In other words, AI and PLC programs are only loosely coupled, not tightly integrated. PLC programs are not taking the true advantages of AI in automation.

Therefore, there is a need of a better integration of AI in automation.

SUMMARY

Briefly described, aspects of the present invention relate to an automation programming paradigm that is designed to take advantage of Artificial Intelligence (AI). The algorithm in a Function Block is coded and learned. A lot of data in the Programmable Logic Controller (PLC) is used for AI, which improves the PLC performance. Functions are encapsulated in FB (Function blocks) or SFB (System function blocks). Each block has input port and output ports. Function blocks can be wired together to compose a larger program. A data set, as input, is used for training for an AI algorithm. Once trained, a trained model is created and deployed onto the system. During execution, the new data set can be fed into the model, inference will occur at runtime, and the result is the desired output. The AI is directly assisting the automation functions executed in the PLC programs. In other words, AI and PLC programs are closely coupled and tightly integrated. PLC programs are taking the true advantage of AI in automation.

In accordance with one illustrative embodiment of the present invention, a system for operating a control program of a programmable logic controller (PLC) is provided. The system comprises a processor and a memory for storing algorithms executed by the processor. The algorithms comprise a plurality of function blocks comprising at least one input and at least one output. Each function block is configured to control a designated control function of the control program. The algorithms further comprise a control application designed to communicate with automation equipment using one or more automation functions. Each automation function comprises one or more equipment-agnostic instructions. The algorithms further comprise a plurality of artificial intelligence (AI) companions such that the at least one input and the at least one output of an existing function block are also available for a corresponding AI companion. Any function blocks in the control program are integrated with a respective AI companion which are generated automatically. Each function block has an associated AI companion configured to perform steps comprising using the at least one input and the at least one output to train the associated AI companion and once the associated AI companion is fully trained, the associated AI companion is configured to take over an original function block and perform an operation with some unknown inputs. The algorithms further comprise a runtime component for executing a runtime operation of the PLC. The runtime operation comprises enhancing a functionality of the plurality of function blocks with the plurality of artificial intelligence (AI) companions in a passive state of monitoring or with the plurality of artificial intelligence (AI) companions in an active state of over taking control.

In accordance with another illustrative embodiment of the present invention, a method of controlling an automation process is provided. The method comprises pairing an artificial intelligence (AI) companion to a function block of a programmable logic controller (PLC) control program, wherein the function block is a designated control function associated with at least one input and at least one output. The method further comprises training the AI companion during simulation of inputs while running the PLC control program for a plurality of cycles during development of the function block. The method further comprises validating, by a runtime component, the function block. The method further comprises executing the PLC control program using the AI companion for controlling the designated control function without the function block. The method further comprises optimizing an algorithm of the AI companion during a runtime operation. The method further comprises monitoring, by the runtime component, a programmable logic controller (PLC) wherein on a condition of malfunction, swapping the control of the designated control function from the AI companion to the function block.

In accordance with another illustrative embodiment of the present invention, an intelligent programmable logic controller (PLC) is provided. The PLC comprises a processor configured to execute according to a scan cycle, a volatile computer-readable storage medium comprising a process image area and a non-volatile computer-readable storage medium. The PLC further comprises a plurality of controller components executed by the processor according to the scan cycle. The plurality of controller components comprises a data transfer component configured to update the process image area during each scan cycle with contents comprising automation system data and a function block comprising at least one input and at least one output, wherein the function block is configured to control a designated control function of a control program. The plurality of controller components further comprises an artificial intelligence (AI) companion configured to perform steps comprising using the at least one input and the at least one output to train the associated AI companion and once the associated AI companion is fully trained, the associated AI companion is configured to take over an original function block and perform an operation with some unknown inputs. The plurality of controller components further comprises a runtime component for executing a runtime operation of the PLC. The runtime operation comprises enhancing a functionality of a plurality of function blocks with a plurality of artificial intelligence (AI) companions in a passive state of monitoring or with the plurality of artificial intelligence (AI) companions in an active state of over taking control.

BRIEF DESCRIPTION OF THE DRAWINGS

FIG. 10 illustrates a schematic view of a flow chart of a method of controlling an automation process in accordance with an exemplary embodiment of the present invention.

DETAILED DESCRIPTION

Figure 1:
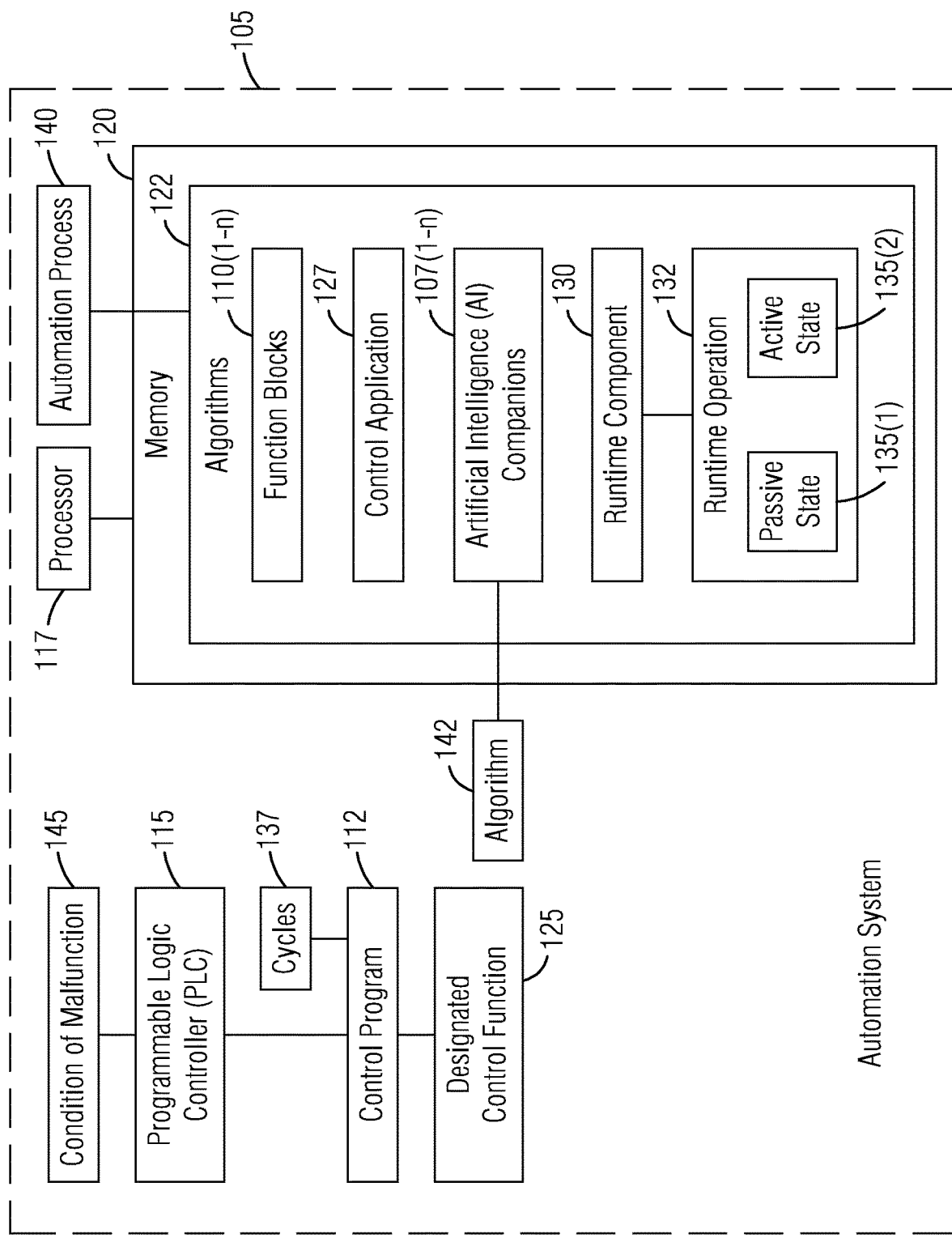
FIG. 1 illustrates a block diagram of an automation system in which an Artificial Intelligence (AI) companion is integrated with each Function Block in a Programmable Logic Controller (PLC) program in accordance with an exemplary embodiment of the present invention.

To facilitate an understanding of embodiments, principles, and features of the present invention, they are explained hereinafter with reference to implementation in illustrative embodiments. In particular, they are described in the context of a system and a method that enable an Artificial Intelligence (AI) companion for each Function Block in a Programmable Logic Controller (PLC) program without changing the existing programs. AI and traditional automation are brought together at the programming level. Artificial Intelligence (AI) companions for Function Blocks are provided in a Programmable Logic Controller (PLC) program for integrating AI in an automation system. An Artificial Intelligence (AI) companion is integrated with each Function Block in a Programmable Logic Controller (PLC) program. An Intelligent Programmable Logic Controller (PLC) is provided. Multiple function blocks and system function blocks are grouped into a logic group. A control problem is broken down from a top level into logical partitions as five functions that are programmed as Function Blocks in a PLC program. Each Function Block and the entire PLC program are integrated with an associated AI Companion. A runtime system for the AI Companion provides new runtime capabilities. An approach to implementing the AI Companions is provided. A method of controlling an automation process is also provided in accordance with an exemplary embodiment of the present invention. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of an automation system according to the present disclosure are described below with reference to FIGS. 1-10 herein. Like reference numerals used in the drawings identify similar or identical elements throughout the several views. The drawings are not necessarily drawn to scale.

Consistent with one embodiment of the present invention, FIG. 1 represents a block diagram of an automation system 105 in which an Artificial Intelligence (AI) companion 107 is integrated with each Function Block 110 in a Programmable Logic Controller (PLC) program such as a control program 112 in accordance with an exemplary embodiment of the present invention. The automation system 105 operates the control program 112 of a programmable logic controller (PLC) 115 and it comprises a processor 117 and a memory 120 for storing algorithms 122 executed by the processor 117.

The programmable logic controller (PLC) 115 is a specialized computer control system configured to execute software which continuously gathers data on the state of input devices to control the state of output devices. A PLC typically includes three major components: a processor (which may include volatile memory), volatile memory comprising an application program, and one or more input/output (I/O) ports for connecting to other devices in the automation system. PLCs are utilized in various industrial settings to control automation systems. Automation systems typically generate a large amount of data in their daily operations. This data may include, for example, sensor data, actuator and control program parameters, and information associated with service activities.

Various embodiments of the present invention are described in the context of the PLC 115 which includes various components configured to provide an assortment of enhanced functions in control applications. This PLC 115, referred to herein as an "Intelligent PLC" is described in greater detail in U.S. application Ser. No. 14/467,125 entitled "Intelligent Programmable Logic Controller," the entirety of which is incorporated herein by reference. Briefly, the Intelligent PLC offers several technical features which may be present in various combinations and used in different embodiments of the present invention. The Intelligent PLC provides efficient data storage on control layer devices. More specifically, functionality of the control layer may be extended by an efficient storage mechanism for time series data (i.e., a "historian" function) which allows short-/mid-term archiving of high resolution time-stamped data. With high fidelity data, no events are lost. Efficient compression algorithms (e.g. a variation of swinging door) may be used to reduce storage and communication demands. The Intelligent PLC may also offer an intelligent on-device data generation method in some embodiments. Methods for data filtering may be applied directly where data is generated to ensure that additional data is only stored if it provides additional information content. These methods may also actively analyze incoming data and configure data acquisition according to the current needs, for example, by adjusting the sample rate or by storing data only if certain events have been detected.

The processor 117 described herein may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

An executable application or a program or an algorithm, as used herein, comprises code or machine readable instructions for conditioning the processor to implement predetermined functions, such as those of an operating system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The algorithms 122 comprise a plurality of function blocks 110(1-$n$) comprising at least one input and at least one output. Each function block 110 is configured to control a designated control function 125 of the control program 112. The algorithms 122 further comprise a control application 127 designed to communicate with automation equipment using one or more automation functions. Each automation function comprises one or more equipment-agnostic instructions. The algorithms 122 further comprise a plurality of artificial intelligence (AI) companions 107(1-$n$) such that the at least one input and the at least one output of an existing function block 110(1) are also available for a corresponding AI companion 107(1). Any function block 110 in the control program 112 are integrated with a respective AI companion 107 which are generated automatically. Each function block 110 has an associated AI companion 107 configured to perform steps comprising using the at least one input and the at least one output to train the associated AI companion 107 and once the associated AI companion 107 is fully trained, the associated AI companion 107 is configured to take over an original function block 110 and perform an operation with some unknown inputs. The algorithms 122 further comprise a runtime component 130 for executing a runtime operation 132 of the PLC 115. The runtime operation 132 comprises enhancing a functionality of the plurality of function blocks 110(1-$n$) with the plurality of artificial intelligence (AI) companions 107(1-$n$) in a passive state 135(1) of monitoring or with the plurality of artificial intelligence (AI) companions 107(1-$n$) in an active state 135(2) of over taking control.

Using at least one input and at least one output to train the associated AI companion 107 includes training the associated AI companion 107 during simulation of inputs while running the control program 112 for a plurality of cycles 137 during development of an associated function block 110. The algorithms 122 control an automation process 140 such that the controlling includes validating, by the runtime component 130, the associated function block 110.

The algorithms 122 execute the control program 112 using the associated AI companion 107 for controlling the designated control function 125 without the associated function block 110. The algorithms 122 optimize an AI algorithm 142 of the associated AI companion 107 during the runtime operation 132. The algorithms 122 monitor, by the runtime component 130, the programmable logic controller (PLC) 115 wherein on a condition of malfunction 145 they swap the control of the designated control function 125 from the associated AI companion 107 to the associated function block 110.

Figure 2:
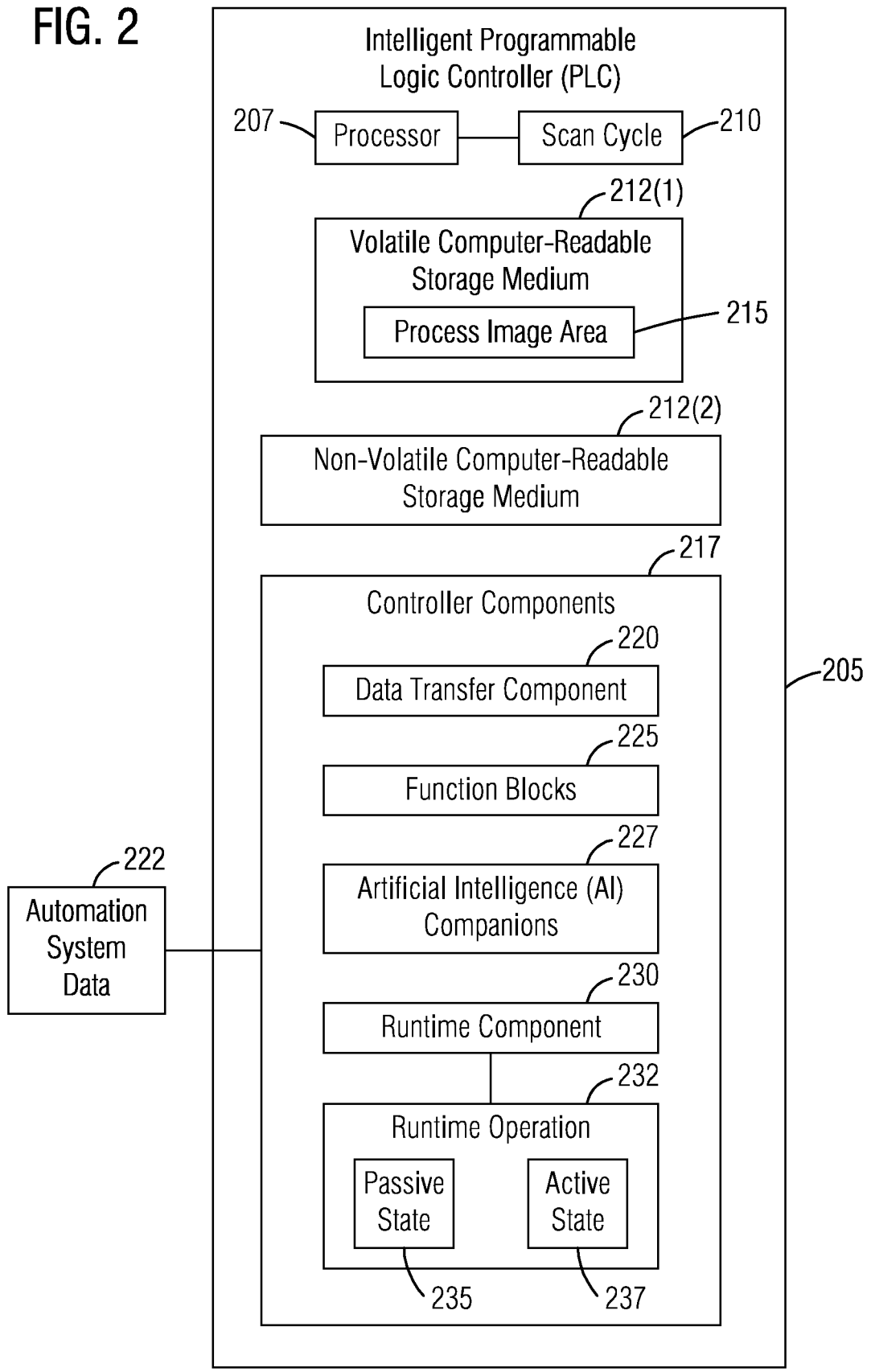
FIG. 2 illustrates a schematic of an Intelligent Programmable Logic Controller (PLC) in accordance with an exemplary embodiment of the present invention.

Referring to FIG. 2, it illustrates a schematic of an Intelligent Programmable Logic Controller (PLC) 205 in accordance with an exemplary embodiment of the present invention. The intelligent programmable logic controller (PLC) 205 comprises a processor 207 configured to execute according to a scan cycle 210, a volatile computer-readable storage medium 212(1) comprising a process image area 215 and a non-volatile computer-readable storage medium 212 (2).

The intelligent programmable logic controller (PLC) 205 further comprises a plurality of controller components 217 executed by the processor 207 according to the scan cycle 210. The plurality of controller components 217 comprises a data transfer component 220 configured to update the process image area 215 during each scan cycle 210 with contents comprising automation system data 222.

The plurality of controller components 217 further comprises a function block 225 comprising at least one input and at least one output. The function block 225 is configured to control the designated control function 125 (see FIG. 1) of the control program 112 (see FIG. 1).

The plurality of controller components 217 further comprises an artificial intelligence (AI) companion 227 configured to perform steps comprising using at least one input and at least one output to train the associated AI companion 227 and once the associated AI companion 227 is fully trained, the associated AI companion 227 is configured to take over an original function block 225 and perform an operation with some unknown inputs.

The plurality of controller components 217 further comprises a runtime component 230 for executing a runtime operation 232 of the intelligent programmable logic controller (PLC) 205. The runtime operation 232 comprises enhancing a functionality of a plurality of function blocks 225 with a plurality of artificial intelligence (AI) companions 227 in a passive state 235 of monitoring or with the plurality of artificial intelligence (AI) companions 227 in an active state 237 of over taking control.

The plurality of controller components 217 control the automation process 140. The plurality of controller components executes the control program 112 using the associated AI companion 227 for controlling the designated control function 125 without the associated function block 225. The plurality of controller components 217 optimizes the AI algorithm 142 of the associated AI companion 227 during the runtime operation 232. The plurality of controller components 217 monitors, by the runtime component 230, the intelligent programmable logic controller (PLC) 205 wherein on the condition of malfunction 145 it swaps the control of the designated control function 125 from the associated AI companion 227 to the associated function block 225.

Figure 3:
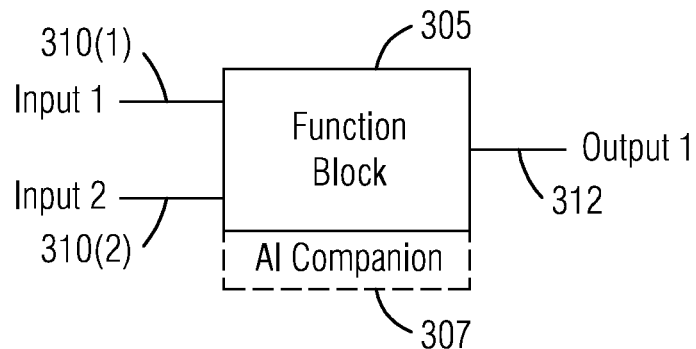
FIG. 3 illustrates a Function Block in a PLC program integrated with an AI Companion block in accordance with an exemplary embodiment of the present invention.

Turning now to FIG. 3, which illustrates a Function Block 305 in a PLC program integrated with an AI Companion block 307 in accordance with an exemplary embodiment of the present invention. A system and a method enable the AI Companion block 307 for each Function Block 305 in the PLC program without changing the existing programs. The method also leverages the availability of AI-capable hardware, like NPU, for AI training and processing. As shown in the FIG. 3, any Function Block 305 in the PLC program will be integrated with the AI Companion block 307, which can be generated automatically. The existing program is not changed. All inputs (e.g., input 1 and input 2) 310(1-2) and outputs (e.g., output 1) 312 of the existing function block 305 are also available for the AI companion block 307.

The AI Companion block 307 is a machine learning algorithm that can use the given inputs 310(1-2) and outputs 312 to train the algorithm. The training can be done during the simulation phases while the Function Block 305 is still being developed. During the operation, the AI companion block 307 can be continually trained and optimized. Once it is fully trained, it can take over the original Function Block 305 and perform the operation with some unknown inputs.

Figure 4:
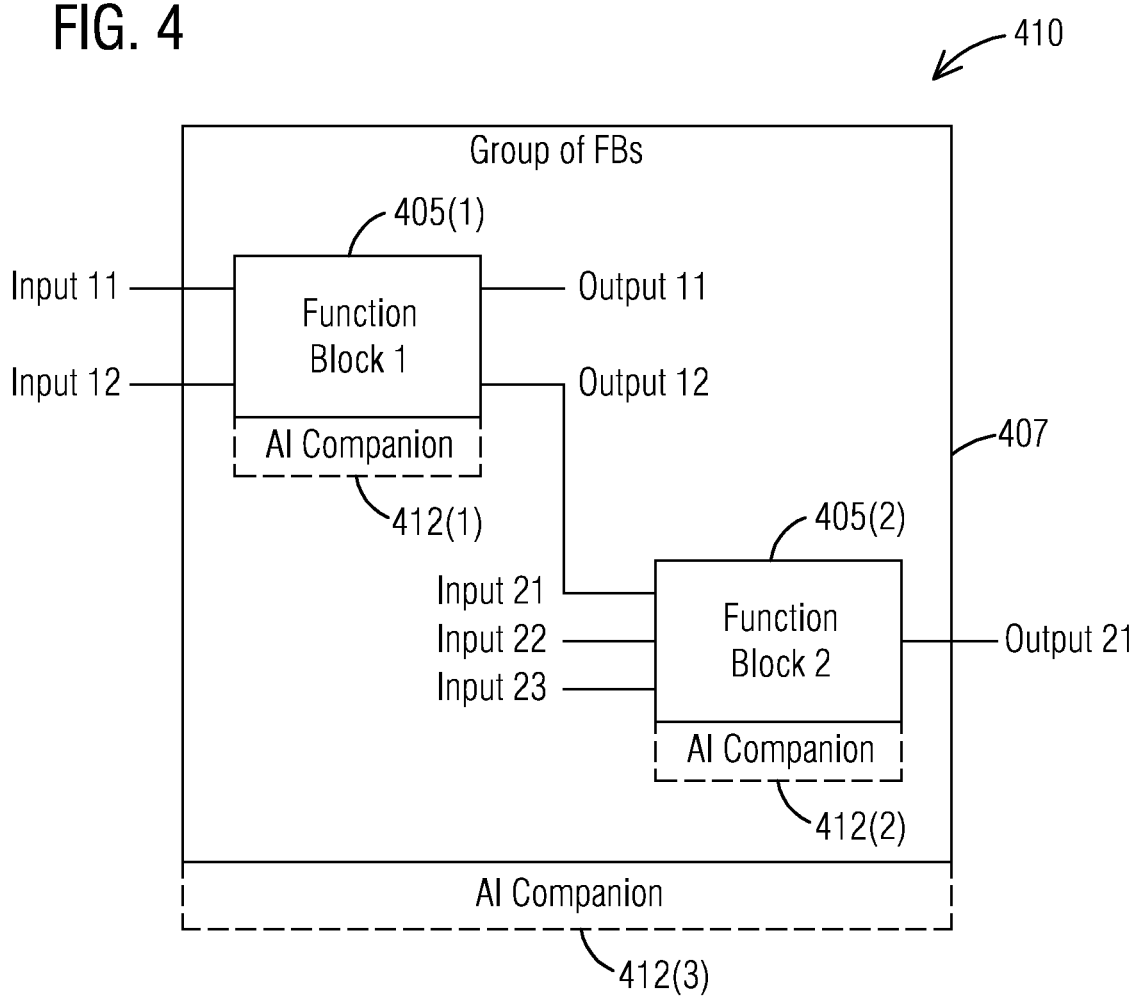
FIG. 4 illustrates multiple function blocks and system function blocks grouped into a logic group in accordance with an exemplary embodiment of the present invention.

FIG. 4 illustrates first and second function blocks 405(1-2) and a system function block 407 grouped into a logic group 410 in accordance with an exemplary embodiment of the present invention. First and second AI Companions 412(1-2) are associated with the first and second function blocks 405(1-2) respectively. In PLC programs, sometimes multiple function blocks, system function blocks are group into the logic group 410, which also has inputs (e.g., input11, input12, input21, input22, inpur23) and outputs (e.g., output11, output12, output21). In such cases, an AI companion 412(3) for the logic group 410 can also be generated. Similar training and runtime inferences can be executed in the AI Companion 412(3) for the logic group 410. An example of a PLC program is a fermentation control system.

Figure 5:
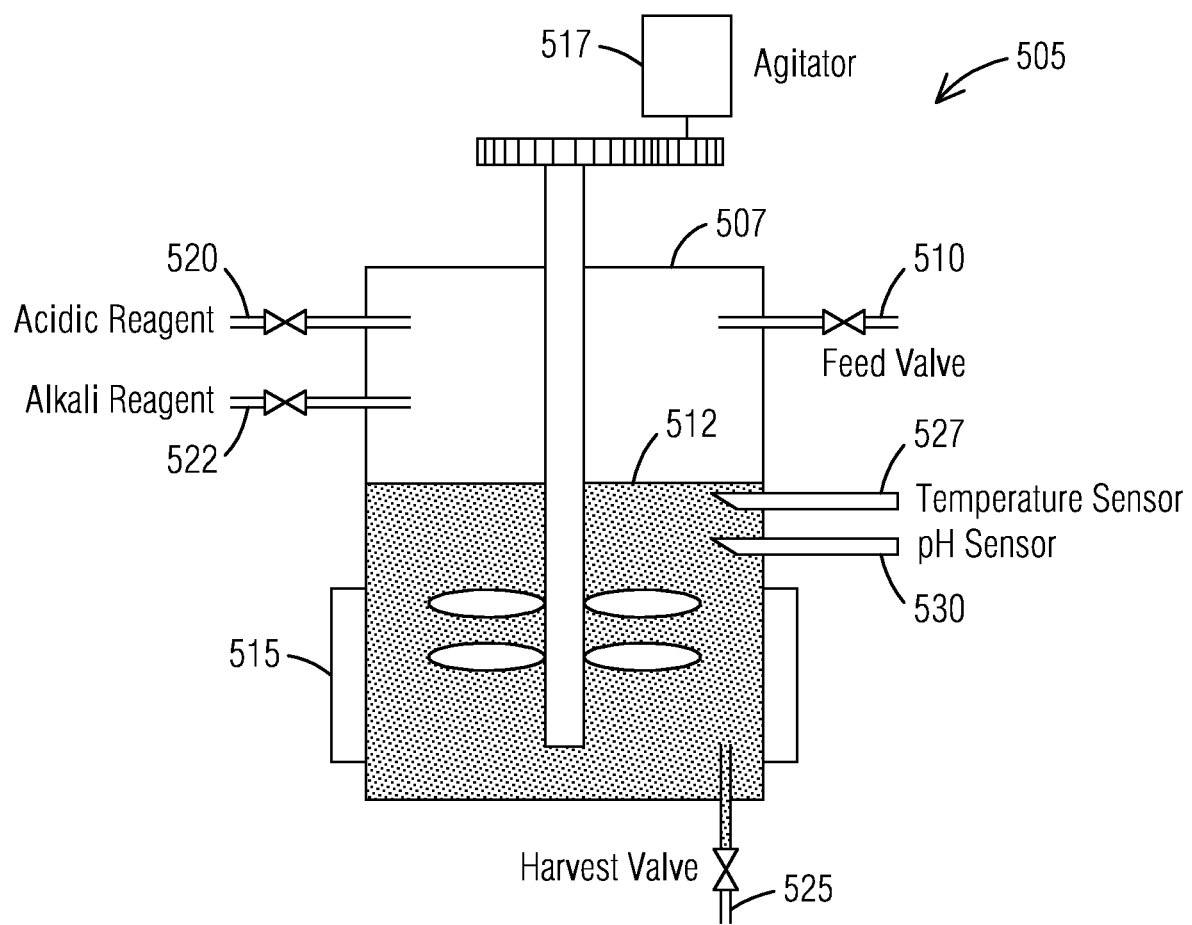
FIG. 5 illustrates a control problem in accordance with an exemplary embodiment of the present invention.

As seen in FIG. 5, it illustrates a control problem of a fermentation control system 505 in accordance with an exemplary embodiment of the present invention. The fermentation control system 505 includes a large vessel 507 that can be filled via a feed valve 510 with a liquid 512. The liquid 512 can be heated with a heater band 515 (cooling via convection) and can be stirred via a motor of an agitator 517. An acid fluid can be added via an acid valve 520 and an alkali fluid can be added via an alkali valve 522 into the vessel 507. The fermentation control system 505 includes a harvest valve 525 to collect a fermented liquid. The fermentation control system 505 further includes a temperature sensor 527 and a pH sensor 530. All external interfaces can be defined for the control problem as described next.

Figure 6:
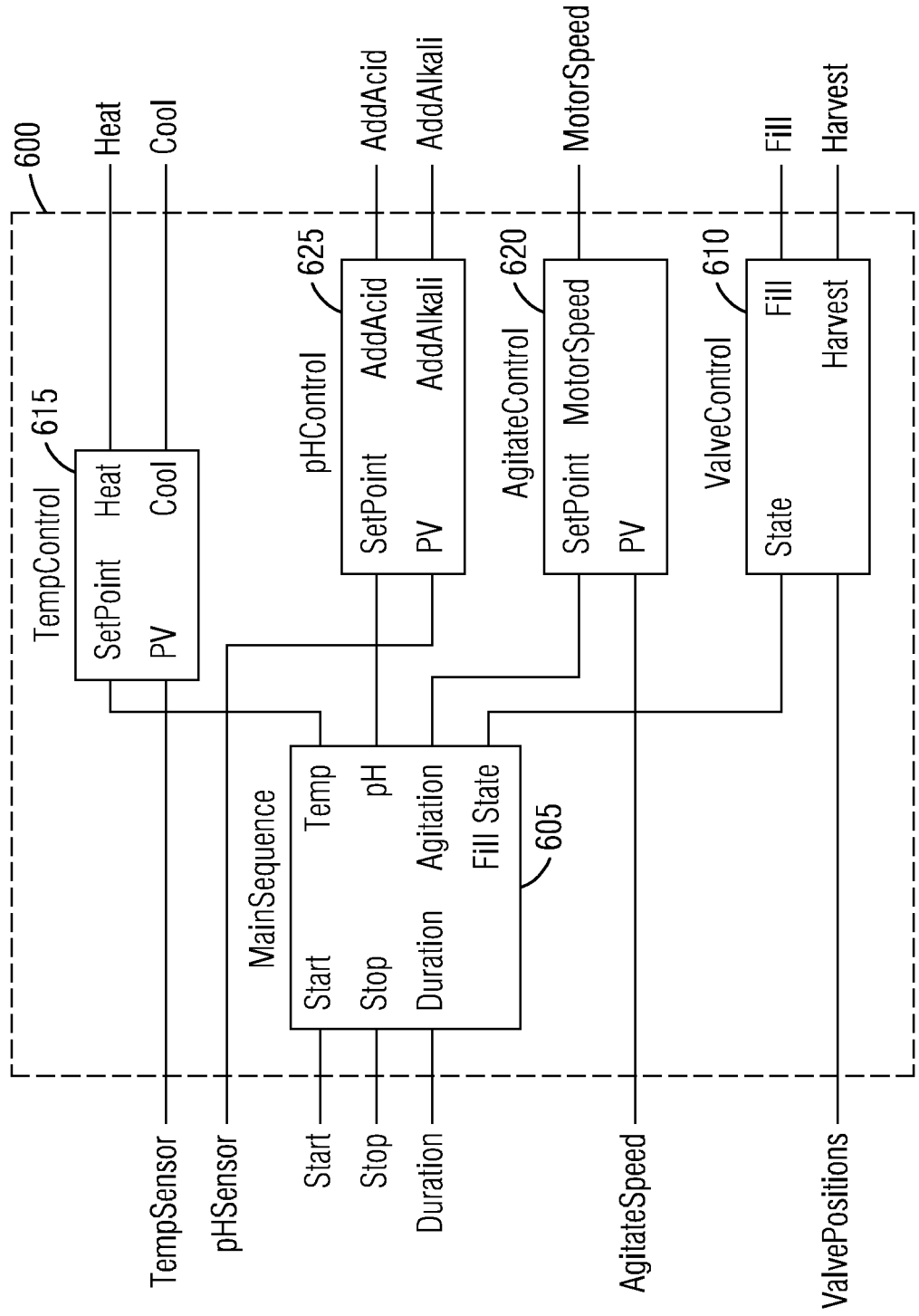
FIG. 6 illustrates the control problem of FIG. 5 broken down from a top level into logical partitions as five functions that are programmed as Function Blocks in a PLC program in accordance with an exemplary embodiment of the present invention.

As shown in FIG. 6, it illustrates the control problem of FIG. 5 broken down from a top level into logical partitions as five functions that are programmed as Function Blocks in a PLC program 600 in accordance with an exemplary embodiment of the present invention. By analysis of the control problem broken down from the top level into the logical partitions, one can easily identify 5 functions:
1. Main Sequence (605), e.g., top level process steps—filling, heating, agitating, fermenting, harvesting, cleaning.
2. Valve control (610), e.g., operating valves used to fill and empty the vessel 507.
3. Temperature control (615) for monitoring the temperature of the vessel 507 modulating the heater band 515.
4. Agitator control (620) for the agitator 517 motor activated as demanded by the main process sequence.
5. pH Control (625) for monitoring the acidity of the fermentation contents, adding acidic or alkali reagents as required.

As shown in FIG. 6, these 5 functions are programmed as Function Blocks in a PLC program.

Figure 7:
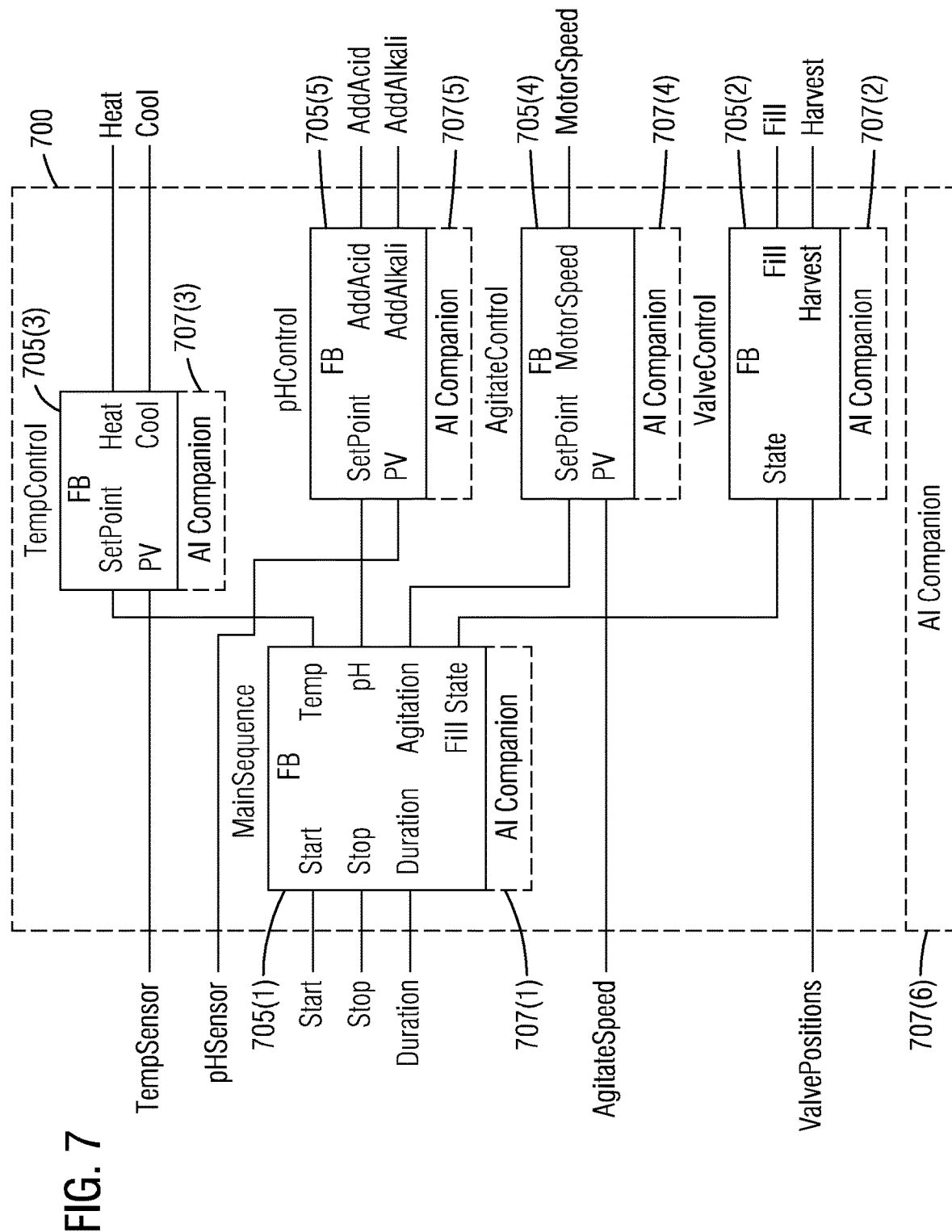
FIG. 7 illustrates each Function Block and the entire PLC program integrated with an AI Companion in accordance with an exemplary embodiment of the present invention.

In FIG. 7, it illustrates each Function Block 705(1-5) and associated AI Companions 707(1-5) and an entire PLC program 700 integrated with an AI Companion 707(6) in accordance with an exemplary embodiment of the present invention.

Figure 8:
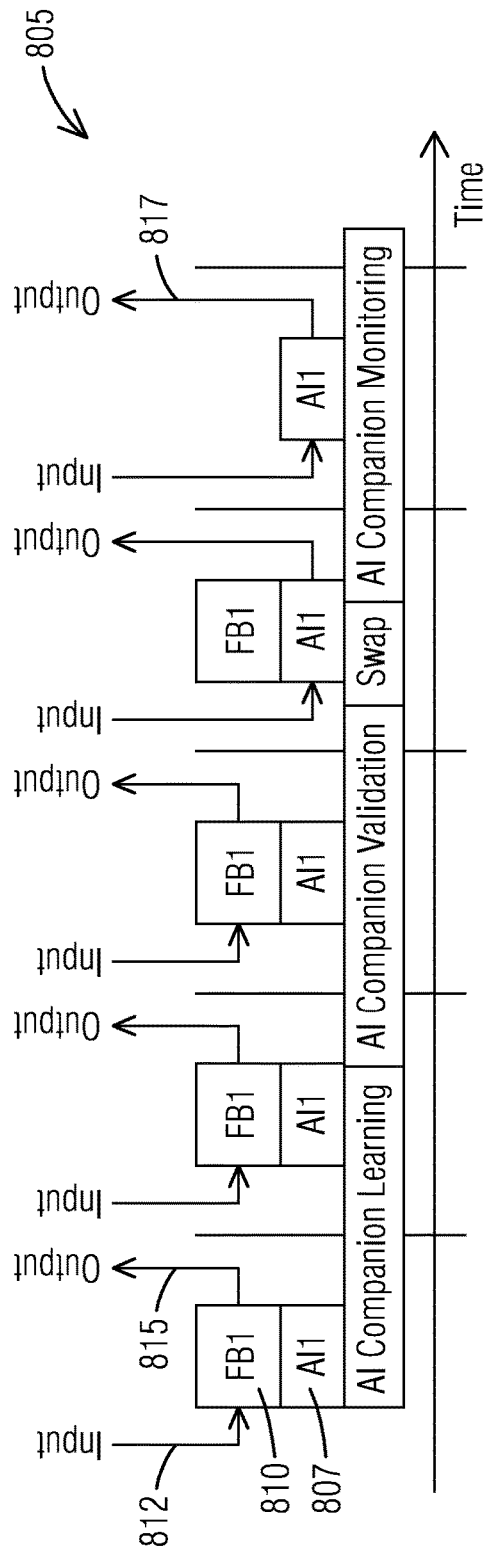
FIG. 8 illustrates a runtime system for the AI Companion that provides new runtime capabilities in accordance with an exemplary embodiment of the present invention.

FIG. 8 illustrates a runtime system 805 for an AI Companion 1 (AI1) 807 that provides new runtime capabilities in accordance with an exemplary embodiment of the present invention. The runtime system 805 for the AI Companion 1 (AI1) 807 provides new capabilities that are not covered in current or known runtime environments. The AI Companion 1 (AI1) 807 and its Function Block (FB) (a Function block 1 (FB1) 810) can co-exist. Depending upon an application, it is also possible that the AI Companion 1 (AI1) 807 provides the additional monitoring and alarming functions (diagnostics & prognostics), while the Function block 1 (FB1) 810 offers the control. In some other applications, the AI Companion 1 (AI1) 807 can take over the control from the Function block 1 (FB1) 810.

First the AI Companion 1 (AI1) 807 learns the behavior of the Function block 1 (FB1) 810. Therefore, inputs 812 to the Function block 1 (FB1) 810 are copied and provided to the AI Companion 1 (AI1) 807 on every cycle until a satisfactory learning score is achieved. Training the AI Companion 1 (AI1) 807 may take several cycles and can be done either on an edge device or on a cloud. Once the AI Companion 1 AI1) 807 has reached a certain level of confidence, then the runtime system 805 must then validate its behavior against the current inputs and outputs 815 generated by the Function block 1 (FB1) 810. The validation step can be done either on the edge device, or on the cloud.

When the validation step is deemed appropriate and safe, the runtime system 805 then swaps the Function block 1 (FB1) 810 with the AI Companion 1 (AI1) 807. This requires passing the live inputs to the AI Companion, and passing the live outputs 817 from the AI Companion 1 (AI1) 807 to the rest of the system. When the AI Companion 1 (AI1) 807 is deployed in the system, there is a monitoring capability in the runtime system 805 that observes any deviations in its behavior, inputs, or outputs, and in case of malfunction, swap the original function block (Function block 1 (FB1) 810) and trigger a system alarm.

Figure 9:
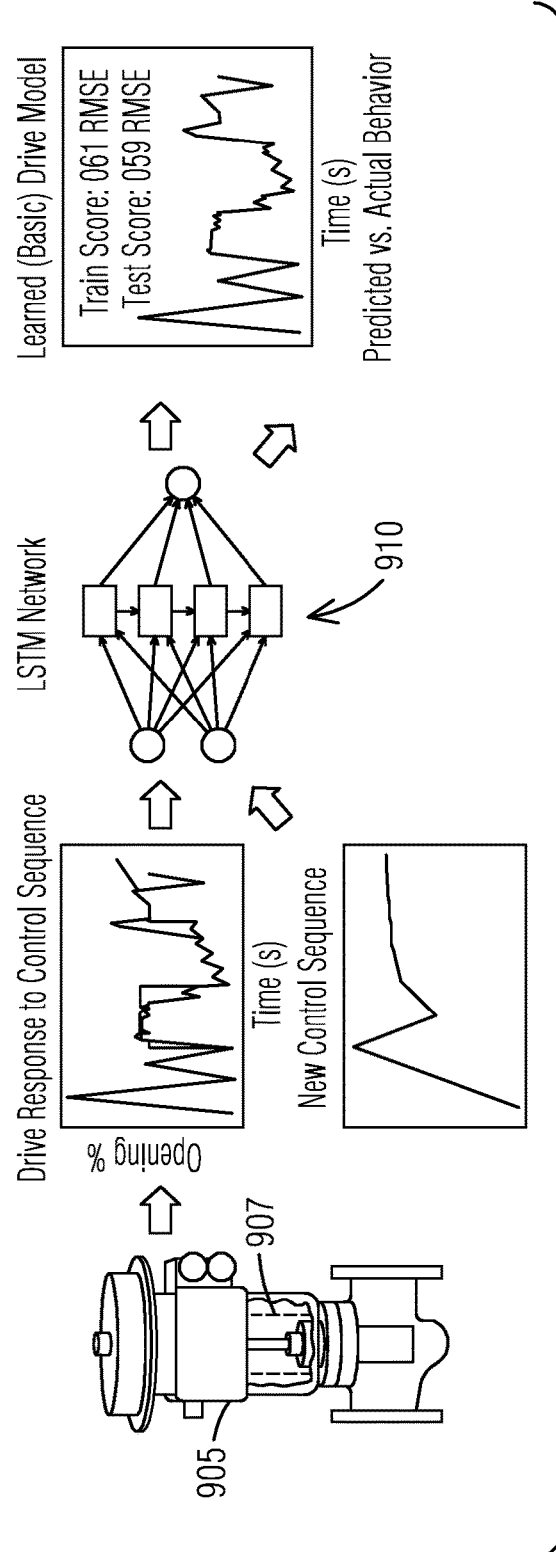
FIG. 9 illustrates an approach to implementing the AI Companions in accordance with an exemplary embodiment of the present invention.

FIG. 9 illustrates an approach to implementing AI Companions in accordance with an exemplary embodiment of the present invention. There are three major approaches to implementing the AI companions:

1. Time series forecasting. These methods analyze time series to extract statistics and other properties of the data and predict future values based on previously observed values. A time series is a sequence of observations taken sequentially in time. Time series analysis involves developing models that best capture or describe an observed time series in order to understand the underlying causes. This often involves making assumptions about the form of the data and decomposing the time series into constitution components. The quality of a descriptive model is determined by how well it describes all available data and the interpretation it provides to better inform the problem domain. The primary objective of time series analysis is to develop mathematical models that provide plausible descriptions from sample data. Making predictions about the future is called extrapolation in the classical statistical handling of time series data. More modern fields focus on the topic and refer to it as time series forecasting. Forecasting involves taking models fit on historical data and using them to predict future observations. Descriptive models can borrow for the future (i.e. to smooth or remove noise), they only seek to best describe the data. The purpose of time series analysis is generally twofold: to understand or model the stochastic mechanisms that gives rise to an observed series and to predict or forecast the future values of a series based on the history of that series.

2. Deep Neural Networks. A deep neural network is a neural network with a certain level of complexity, a neural network with more than two layers. Deep neural networks use sophisticated mathematical modeling to process data in complex ways. For given FB inputs, the deep neural network establishes a probabilistic relationship to each output. This allows them to predict the current output.

3. Recurrent Neural Networks. Recurrent networks such as Long short-term memory (LSTM) have feedback connections that allow them to process sequences of data. Long short-term memory (LSTM) is an artificial recurrent neural network (RNN) architecture used in the field of deep learning. Unlike standard feedforward neural networks, LSTM has feedback connections. Given a sequence of FB inputs, the recurrent neural networks establish a probabilistic relationship to the next output. This allows them to predict the current and next N outputs.

Consider again FIG. 9. The task of the FB is to regulate the opening of the SIPART PS2 (gray box 905) from 0 (fully closed) to 100 (fully open) such that a control sequence is precisely followed by a drive (box 907). In this example, a LSTM network 910 was trained with two inputs corresponding to the control sequence (x0) and the historical of the drive (x1), four LSTM cells, and a single output corresponding to the next position for the drive (y0). As is shown in the results, the LSTM network 910 is capable of predicting the next position of the drive 907. This experiment shows that an LSTM network 910 can replace the original FB and effectively becomes an AI companion for the FB.

FIG. 10 illustrates a schematic view of a flow chart of a method 1005 of controlling an automation process in accordance with an exemplary embodiment of the present invention. Reference is made to the elements and features described in FIGS. 1-10. It should be appreciated that some steps are not required to be performed in any particular order, and that some steps are optional.

The method 1005 comprises a step 1010 of pairing the artificial intelligence (AI) companion 107 to the function block 110 of the programmable logic controller (PLC) control program 112. The function block 110 is the designated control function 125 associated with at least one input and at least one output. The method 1005 further comprises a step 1015 of training the AI companion 107 during simulation of inputs while running the PLC control program 112 for a plurality of cycles during development of the function block 110.

The method 1005 further comprises a step 1020 of validating, by the runtime component 130, the function block 110. The method 1005 further comprises a step 1025 of executing the PLC control program 112 using the AI companion 107 for controlling the designated control function 125 without the function block 110. The method 1005 further comprises a step 1030 of optimizing an algorithm of the AI companion 107 during the runtime operation 132. The method 1005 further comprises a step 1035 of monitoring, by the runtime component 130, the programmable logic controller (PLC) 115 wherein on a condition of malfunction, swapping the control of the designated control function 125 from the AI companion 107 to the function block 110.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

AI companion for Function blocks and groups of function blocks in PLC programs are provided such that the AI companion 107 is highly integrated with the PLC program 112 and take the same inputs and produce the outputs. The AI companion 107 uses machine learning algorithms to train based on the inputs first. Automatic generation of AI companions is provided. The existing code for the PLC function blocks is not changed. The AI companion 107 leverages the existing add-on (e.g. SIMATIC NPU) for AI computation power and storage. The functionality of Function Blocks 110 is enhanced with passive AI companion (monitoring) or active AI companion (over taking control). The present invention may be used in industrial control systems and edge devices.

By the present invention, a higher performance in cycle time is made possible. AI companions have the potential to be faster than their FB counterparts. Re-engineering is eliminated. Legacy applications that rely on FBs for which the source code is no longer available, or would take too long to re-engineer, can benefit from AI companion by eliminating the reengineering. If the complexity of the FB 110 is high and requires many cycles to execute, a simpler AI companion 107 that requires less cycles can be trained. This frees the CPU resources in the PLC 115 and allows faster cycle times. The learning process eliminates the need to re-engineer an FB 110. The new PLCs 115 can execute more FBs per cycle than competitors. The new PLCs 115 may be used for modernizing factories with legacy PLCs. Customers will no longer fear the migration since the behavior of their FBs 110 can be learned by the AI companions 107.

While industrial control systems and edge devices with AI companions are described here a range of one or more other types of automation systems or other forms of automation systems are also contemplated by the present invention. For example, other types of automation systems may be implemented based on one or more features presented above without deviating from the spirit of the present invention.

The techniques described herein can be particularly useful for programmable logic controllers (PLCs). While particular embodiments are described in terms of the programmable logic controller (PLC), the techniques described herein are not limited to a programmable logic controller (PLC) but can also be used with other automation controllers.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system for operating a control program of a programmable logic controller (PLC), the system comprising:
   a processor; and
   a memory for storing algorithms executed by the processor, the algorithms comprising:
   a plurality of function blocks comprising at least one input and at least one output, each function block configured to control a designated control function of the control program;
   a control application designed to communicate with automation equipment using one or more automation functions, wherein each automation function comprises one or more equipment-agnostic instructions;
   a plurality of artificial intelligence (AI) companions such that the at least one input and the at least one output of an existing function block are also available for a corresponding AI companion, wherein any function blocks in the control program are integrated with a respective AI companion which are generated automatically, wherein each function block has an associated AI companion configured to perform steps comprising:
   using the at least one input and the at least one output to train the associated AI companion, and
   once the associated AI companion is fully trained, the associated AI companion is configured to take over an original function block and perform an operation with some unknown inputs; and
   a runtime component for executing a runtime operation of the PLC, the runtime operation comprising:
   enhancing a functionality of the plurality of function blocks with the plurality of artificial intelligence (AI) companions in a passive state of monitoring or with the plurality of artificial intelligence (AI) companions in an active state of over taking control, wherein AI companion for function blocks and groups of function blocks in PLC programs are provided such that the AI companion is highly integrated with a PLC program, and wherein an automatic generation of AI companions that are integral to function blocks is provided and AI companions get data in and out directly from a process image.

2. The system of claim 1, wherein using the at least one input and the at least one output to train the associated AI companion includes training the associated AI companion during simulation of inputs while running the control program for a plurality of cycles during development of an associated function block.

3. The system of claim 2, wherein the algorithms controlling an automation process such that the controlling includes validating, by the runtime component, the associated function block.

4. The system of claim 3, wherein the algorithms executing the control program using the associated AI companion for controlling the designated control function without the associated function block.

5. The system of claim 4, wherein the algorithms optimizing an algorithm of the associated AI companion during a runtime operation.

6. The system of claim 5, wherein the algorithms monitoring, by the runtime component, the programmable logic controller (PLC) wherein on a condition of malfunction, swapping the control of the designated control function from the associated AI companion to the associated function block.

7. A method of controlling an automation process, comprising:
   pairing an artificial intelligence (AI) companion to a function block of a programmable logic controller (PLC) control program, wherein the function block is a designated control function associated with at least one input and at least one output;
   training the AI companion during simulation of inputs while running the PLC control program for a plurality of cycles during development of the function block;
   validating, by a runtime component, the function block;
   executing the PLC control program using the AI companion for controlling the designated control function without the function block;
   optimizing an algorithm of the AI companion during a runtime operation;

monitoring, by the runtime component, a programmable logic controller (PLC) wherein on a condition of malfunction, swapping the control of the designated control function from the AI companion to the function block, wherein AI companion for function blocks and groups of function blocks in PLC programs are provided such that the AI companion is highly integrated with a PLC program, and wherein an automatic generation of AI companions that are integral to function blocks is provided and AI companions get data in and out directly from a process image.

8. The method of claim 7, wherein training the AI companion includes copying inputs to the function block and providing the inputs to the AI companion on every cycle until a satisfactory learning score is achieved.

9. The method of claim 8, wherein training the AI companion includes training the AI companion for a plurality of cycles.

10. The method of claim 9, wherein training is done either on an edge device or on a cloud.

11. The method of claim 7, wherein the runtime component waits for the AI companion to reach a certain level of confidence before validating behavior of the AI companion against current inputs and results generated by the function block.

12. The method of claim 11, wherein validation is done either on an edge device or on a cloud.

13. The method of claim 7, wherein the runtime component swaps the function block with the AI companion by passing live inputs to the AI companion and passing live outputs from the AI companion to the rest of a system.

14. The method of claim 13, wherein the runtime component observes any deviations in behavior, inputs, or outputs of the AI companion once the AI companion is deployed in the system.

15. An intelligent programmable logic controller (PLC) comprising:
a processor configured to execute according to a scan cycle;
a volatile computer-readable storage medium comprising a process image area;
a non-volatile computer-readable storage medium; and
a plurality of controller components executed by the processor according to the scan cycle, the plurality of controller components comprising:
a data transfer component configured to update the process image area during each scan cycle with contents comprising automation system data;
a function block comprising at least one input and at least one output, wherein the function block is configured to control a designated control function of a control program;
an artificial intelligence (AI) companion configured to perform steps comprising:
using the at least one input and the at least one output to train the associated AI companion, and
once the associated AI companion is fully trained, the associated AI companion is configured to take over an original function block and perform an operation with some unknown inputs; and
a runtime component for executing a runtime operation of the PLC, the runtime operation comprising:
enhancing a functionality of a plurality of function blocks with a plurality of artificial intelligence (AI) companions in a passive state of monitoring or with the plurality of artificial intelligence (AI) companions in an active state of over taking control, wherein AI companion for function blocks and groups of function blocks in PLC programs are provided such that the AI companion is highly integrated with a PLC program, and wherein an automatic generation of AI companions that are integral to function blocks is provided and AI companions get data in and out directly from a process image.

16. The intelligent programmable logic controller (PLC) of claim 1, wherein using the at least one input and the at least one output to train the associated AI companion includes training the associated AI companion during simulation of inputs while running the control program for a plurality of cycles during development of an associated function block.

17. The intelligent programmable logic controller (PLC) of claim 16, wherein the plurality of controller components controlling an automation process such that the controlling includes validating, by the runtime component, the associated function block.

18. The intelligent programmable logic controller (PLC) of claim 17, wherein the plurality of controller components executing the control program using the associated AI companion for controlling the designated control function without the associated function block.

19. The intelligent programmable logic controller (PLC) of claim 18, wherein the plurality of controller components optimizing an algorithm of the associated AI companion during a runtime operation.

20. The intelligent programmable logic controller (PLC) of claim 19, wherein the plurality of controller components monitoring, by the runtime component, the programmable logic controller (PLC) wherein on a condition of malfunction, swapping the control of the designated control function from the associated AI companion to the associated function block.

* * * * *